Nov. 7, 1967  A. L. JENNY  3,351,823
NON-AQUEOUS CAPACITOR ELECTROLYTE HAVING A SALT DISSOLVED
IN A CO-SOLVENT
Filed May 24, 1965

INVENTOR:
ALFRED L. JENNY,

BY *Harold A. Levey, Jr.*
HIS ATTORNEY.

United States Patent Office 3,351,823
Patented Nov. 7, 1967

3,351,823
NON-AQUEOUS CAPACITOR ELECTROLYTE HAVING A SALT DISSOLVED IN A CO-SOLVENT
Alfred L. Jenny, Columbia, S.C., assignor to General Electric Company, a corporation of New York
Filed May 24, 1965, Ser. No. 458,246
5 Claims. (Cl. 317—230)

ABSTRACT OF THE DISCLOSURE

A non-aqueous electrolytic composition is disclosed which includes a conducting salt dissolved in a mixture of butyrolactone and N-methyl pyrrolidone, the electrolyte also containing a viscosity modifying agent of a mono or di lower alkyl substituted amide.

---

This invention relates to electrolytic capacitors and to new and improved electrolytes therefor.

In the development of electrolytic capacitors a major effort and emphasis has been placed on electrolytes which make electrolytic capacitors useful over a wide range of conditions without any significant loss in properties and without deterioration of the capacitor components.

Presently, all electrolytic capacitors employ at least one etched and formed electrode generally of a film-forming metal such as aluminum, tantalum, titanium, zirconium or niobium.

As now defined in the art, "formed" carries the connotation that the metal used for the anode has been oxidized to produce a dielectric coating by conventional means now available.

Electrolytes used in the past for aluminum and tantalum electrolytic capacitors have been composed of aqueous solutions of strong mineral acids, such as phosphoric or sulfuric, or concentrated salts of highly soluble compounds, such as lithium or calcium chloride. Extensive use has also been made of the low temperature eutectic mixture of ethylene glycol and water as a solvent for inorganic borates, nitrates, acetates, etc. A common disadvantage of all the above electrolytes is the large increase in resistivity of the electrolyte at temperature extremes, as for example the value at −55° C. as compared with the value at 125° C. The result is a capacitor wherein the dissipation factor and capacitance value vary excessively between these temperature extremes.

More recently, nonaqueous electrolytes have been used in an attempt to overcome the foregoing disadvantages. One example of such nonaqueous electrolyte is found in U.S. Patent 2,965,816, which denotes dimethyl formamide as a single solvent for certain conducting species of salts such as ammonium nitrate. The operating range of temperatures of capacitors using dimethyl formamide solutions, however, is limited and solvents which can provide a broader temperature range of operation are much sought after. An example of such improved solvents is set forth in application Ser. No. 254,678, filed Jan. 29, 1963, assigned to the assignee of the present invention, and now U.S. Patent 3,302,071.

An object of the present invention is the production of electrolytic capacitors suitable for use over broad temperature ranges for long periods of time without adverse or detrimental changes of electrical properties.

A further object is the production of an electrolyte for electrolytic capacitors operable at both high and low temperatures.

In accordance with the invention, an electrolytic capacitor uses as its electrolyte a salt dissolved in a co-solvent and, in turn, the addition of a viscosity modifying agent to the combination which yields properties not found to date in such devices. The electrolyte exhibits the qualities of maintaining a relatively stable capacitance which has the unique feature of a high degree of retention of percent capacitance with a correspondingly low dissipation factor at varied temperatures.

The present invention achieves the aforementioned objectives by the formation of an electrolytic capacitor incorporating a plurality of electrodes, at least one of these electrodes being coated with a metallic oxide dielectric layer, the electrodes being physically separated and in contact with the electrolytes hereinafter described.

The present invention, as now described in greater detail, makes available electrolytic capacitors having the desired improved properties by the utilization of conducting salt species dissolved completely in a mixture of butyrolactone and N-methyl pyrrolidone to which solution is added a mono or di lower alkyl substituted amide, as a viscosity modifying agent.

More specifically, it has now been found that novel electrolytes can be prepared by dissolving a conducting salt, from 0.06% to 4.0% by weight, in a mixture of from 15.2% to 21.8%, by weight, of N-methyl pyrrolidone and from 38.5% to 55.0%, by weight, of butyrolactone, and the incorporation therewith, after complete solution, of from 21.4% to 46.2%, by weight, of an amide. In the practice of this invention, dimethyl formamide in the range set forth in preferred.

The amides and other materials found useful as viscosity modifying agents include dimethyl formamide, dimethyl acetamide, dimethyl propionamide, N-ethylacetamide, ethylene glycol, dimethyl sulfoxide, diethylcyanamide and tributylamine.

The conducting salts employed herein are salts of a non-metallic cation and a film-forming anion, the term "film-forming anion" referring to an anion reducible at the anode to effect repair of the oxide film, if necessary, or if used in the formation process to produce the desired dielectric film. Accordingly, the non-metallic cations include, for example, ammonium, and organic substituted ammonium radicals. The film-forming anions, for example, include the acetate, borate and phosphate ions. More specifically, representative salts include ammonium nitrate, ammonium acetate, lithium acetate, ammonium oxalate, lithium nitrate, and calcium nitrate.

As indicated previously, the salts used in the formation of the present electrolytes must exhibit nearly complete solubility in the mixed co-solvents of butyrolactone and N-methyl pyrrolidone. It is further essential that the salt be substantially dissolved in the co-solvent prior to the addition of the amide, the purpose of the amide being that of a viscosity improver and not a solvent. It has also been determined that the resistivity of the electrolytes as formulated in the ranges hereinbefore specified vary from 150 to 2500 ohms per centimeter at 25° C.

Additional objects of the present invention will be apparent from the specification and drawings, in which.

Figure 1:
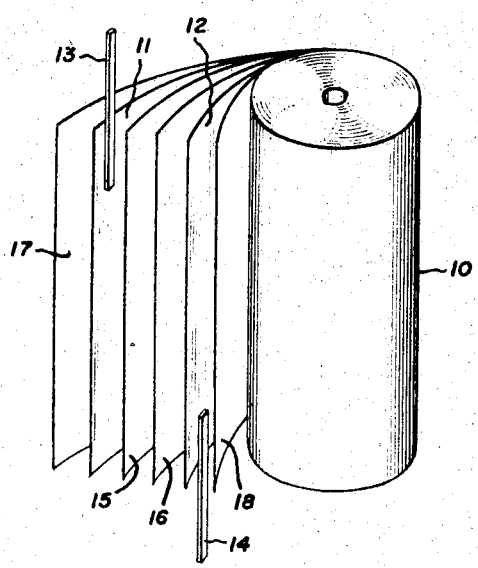
FIGURE 1 shows the rolled plates of an electrolytic capacitor.

Referring to FIGURE 1, there is shown a partially unrolled capacitor body 10 having two electrodes 11 and 12, at least one of which is made of aluminum or other appropriate material as discussed hereinbefore. The terminals 13 and 14 are secured to the electrodes 11 and 12 respectively and are of opposite polarity serving as capacitor terminals. The electrodes 11 and 12 are separated by spacers 15 and 16 and lie between spacers 17 and 15 and 18 and 16. The spacers are composed of cellulosic material, including paper made of kraft fibers, vegetable fibers, such as Benares hemp, or other suitable material of permeable or porous impregnable nature such as synthetic polymers, glass fibers or semi-permeable membranes. The composite spacers and electrodes are rolled into a body 10 suitable for impregnation with the electrolyte of the present invention, before or after insertion into the case of the capacitor.

Figure 2:
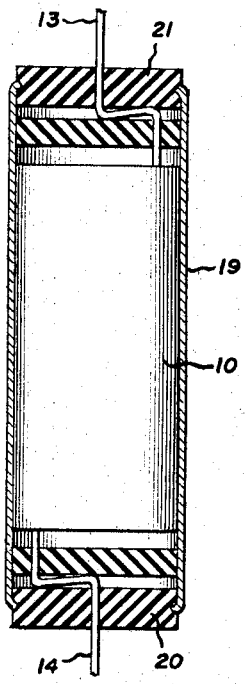
FIGURE 2 is a partial cross-sectional view of an electrolytic capacitor showing the fitting of the rolled plates.

Referring to FIGURE 2, the capacitor body 10 is inserted into the capacitor case 19, the terminals 13 and 14 extending through the insulating caps 20 and 21 which close off the ends of the capacitor case 19 and tightly seal the electrolyte in the case 19.

The electrolytes and capacitors of the present invention made therewith and life testing data on these capacitors are given in the following examples wherein all parts and percentages are by weight.

Example 1

| | Weight percent |
|---|---|
| Butyrolactone | 36.60 |
| N-methyl pyrrolidone | 14.48 |
| Dimethyl formamide | 44.22 |
| Ammonium nitrate | 4.70 |

The foregoing composition was used in a non-polar, etched design capacitor and a life test carried out on this capacitor initially as 10 v. DC and 25° C. gave the following results:

| Hours on Test | Temp., °C. | Cap., Percent | D.F. (Percent) | Leak. Curr. (microamperes [μa.]) at 25° C. |
|---|---|---|---|---|
| 0 | 25 | 100.0 | 5.85 | 20.1 |
| 500 | 25 | 97.5 | 6.47 | 0.1 |
| 1,000 | 25 | 96.5 | 6.27 | 0.3 |
| 2,000 | 25 | 95.5 | 7.35 | 0.5 |

Example 2

Another capacitor, non-polar and of etched design was impregnated with the composition of Example 1 and a life test therein initially at 30 v. DC and 25° C. gave the following results:

| Hours on Test | Temp., °C. | Cap., Percent | D.F. (Percent) | Leak. Curr. (microamperes [μa.]) at 25° C. |
|---|---|---|---|---|
| 0 | 25 | 100.0 | 2.33 | 0.1 |
| 528 | 25 | 98.0 | 2.95 | 0.1 |
| 1,000 | 25 | 97.0 | 3.33 | 0.1 |
| 2,000 | 25 | 96.3 | 4.95 | 0.3 |

Example 3

| | Weight percent |
|---|---|
| Butyrolactone | 38.10 |
| N-methyl pyrrolidone | 15.05 |
| Dimethyl formamide | 45.85 |
| Ammonium nitrate | 1.00 |

The foregoing composition was employed in a non-polar plain design capacitor and the following life test data was obtained initially at 75 v. DC, and at 25° C.

| Hours on Test | Temp., °C. | Cap., Percent | D.F. (Percent) | Leak. Curr. (microamperes [μa.]) at 25° C. |
|---|---|---|---|---|
| 0 | 25 | 100.0 | 0.75 | 0.1 |
| 600 | 25 | 100.0 | 0.90 | 0.9 |
| 1,000 | 25 | 100.0 | 0.90 | 0.2 |
| 2,000 | 25 | 100.0 | 0.90 | 0.4 |

Example 4

Using the composition of Example 3, a polar, etched design capacitor was life tested at initially 100 v. DC, 25° C., with the following results:

| Hours on Test | Temp., °C. | Cap., Percent | D.F. (Percent) | Leak. Curr. (microamperes [μa.]) at 25° C. |
|---|---|---|---|---|
| 0 | 25 | 100.0 | 5.13 | 20.1 |
| 552 | 25 | 96.3 | 5.83 | 0.13 |
| 1,000 | 25 | 95.5 | 5.77 | 1.0 |
| 2,128 | 25 | 94.4 | 5.17 | 0.1 |

Example 5

| | Weight percent |
|---|---|
| Butyrolactone | 38.5 |
| N-methyl pyrrolidone | 15.2 |
| Dimethyl formamide | 46.2 |
| Ammonium nitrate | 0.1 |

The following composition was employed in a non-polar, plain design capacitor and life tested initially at 250 v. DC, 25° C. The following results were obtained:

| Hours on Test | Temp., °C. | Cap., Percent | D.F. (Percent) | Leak. Curr. (microamperes [μa.]) at 25° C. |
|---|---|---|---|---|
| 0 | 25 | 100.0 | 0.75 | 9.4 |
| 500 | 25 | 100.0 | 2.87 | 14.0 |
| 1,000 | 25 | 100.8 | 3.00 | 41.7 |
| 2,000 | 25 | 102.4 | 2.85 | 88.0 |

Example 6

Using the composition of Example 5, a non-polar, plain design capacitor gave the following data initially testing at 290 v. DC, 125° C.

| Hours on Test | Temp., °C. | Cap., Percent | D.F. (Percent) | Leak. Curr. (microamperes [μa.]) at 25° C. |
|---|---|---|---|---|
| 0 | 125 | 120.0 | 3.25 | 0.8 |
| 504 | 25 | 98.5 | 3.50 | 0.8 |
| 1,000 | 25 | 100.0 | 4.25 | 0.5 |
| 2,000 | 25 | 100.0 | 4.25 | 2.3 |

Example 7

| | Weight percent |
|---|---|
| Butyrolactone | 38.54 |
| N-methyl pyrrolidone | 15.20 |
| Dimethyl formamide | 46.20 |
| Ammonium nitrate | 0.06 |

A polar capacitor of plain design employing the foregoing electrolyte composition was life tested at 450 v. DC, 25° C., with the following results:

| Hours on Test | Temp., °C. | Cap., Percent | D.F. (Percent) | Leak. Curr. (microamperes [μa.]) at 25° C. |
|---|---|---|---|---|
| 0 | 25 | 100.0 | 4.85 | 13.4 |
| 525 | 25 | 93.6 | 8.25 | 3.0 |
| 1,029 | 25 | 96.8 | 6.00 | 8.2 |
| 2,133 | 25 | 99.1 | 3.90 | 3.9 |

As pointed out above, the electrolyte of the present invention have better properties than the previously employed solutions using dimethyl formamide. For example, the electrolytes of the present invention have both lower freezing points and higher boiling points than equivalent solutions using dimethyl formamide as the sole solvent. In addition to extending the temperature range of operation of capacitors using the electrolytes of the present invention, significantly better electrical characteristics may result. This is indicated in the contrasting results between Example 8 and Example 9, the latter being within the scope of the present invention while the composition of Example 8 does not constitute a part of this invention.

Example 8

| | Weight percent |
|---|---|
| Dimethyl formamide | 88–99 |
| Oxalic acid | 0.1–10 |
| Ammonium oxalate | 0.01–0.1 |

Five 250 v. DC non-polar capacitors employing the foregoing electrolyte compositions were life tested at 85° C. with the following averaged results.

| Hours on Test | Leakage Current (microamperes) | | Capacitance (microfarads) | D.F., Percent |
|---|---|---|---|---|
| | Forward | Reverse | | |
| 0 | 7.0 | 5.4 | 9.1 | 1.5 |
| 2,000 | 11.0 | 13.0 | 9.1 | 1.3 |

Example 9

| | Weight percent |
|---|---|
| Butyrolactone | 50.90–46 |
| N-methyl pyrrolidone | 18.30–16.7 |
| Dimethyl formamide | 30.69–26.9 |
| Oxalic acid | 0.1–10 |
| Ammonium oxalate | 0.01–0.1 |

Five 250 v. DC non-polar capacitors employing the foregoing electrolyte compositions were life tested at 85° C. with the following averaged results:

| Hours on Test | Leakage Current (microamperes) | | Capacitance (microfarads) | D.F., Percent |
|---|---|---|---|---|
| | Forward | Reverse | | |
| 0 | 1.5 | 1.1 | 1.96 | 1.05 |
| 2,000 | 3.1 | 5.0 | 1.98 | 2.0 |

As evidenced by the foregoing data, the present electrolyte compositions result in capacitors having markedly improved qualities over past electrolytic capacitors, especially in consistency of capacitance over a wide range of temperature and extended life operation.

While the present invention has been described with reference to particular embodiments thereof, it will be understood that various modifications may be made by those skilled in the art without actually departing from the scope of the invention. Therefore, the appended claims are intended to cover all such equivalent variations as come within the true spirit and scope of the invention.

I claim:
1. An electrolytic capacitor comprising:
   (a) a plurality of spaced electrodes at least one of which is coated with a metallic oxide layer;
   (b) and an electrolyte in contact with said electrodes;
   (c) said electrolyte comprising a solvent including:
      (1) 15.2% to 21.8% by weight of N-methyl pyrrolidone;
      (2) 38.5% to 55.0% by weight of butyrolactone and;
      (3) 21.9% to 46.2% by weight of a modifying agent selected from the group consisting essentially of dimethyl formamide, dimethyl acetamide, dimethyl propionamide, N-ethylacetamide, ethylene glycol, dimethyl sulfoxide, diethylcyanamide, and tributylamine;
   (d) said electrolyte having a conducting salt dissolved therein from about 0.06% to 4.0% by weight, said salt including a cation and film-forming anion.
2. A capacitor as rectified in claim 1, in which said salt is lithium nitrate.
3. A capacitor as recited in claim 1, in which said salt is ammonium nitrate.
4. A capacitor as recited in claim 1, wherein the viscosity modifying agent is dimethyl formamide.
5. An electrolyte composition for electrolytic capacitors comprising:
   (a) a solvent, said solvent including:
      (1) 15.2% to 21.8% by weight of N-methyl pyrrolidone;
      (2) 38.5% to 55.0% by weight of butyrolactone and;
      (3) 21.9% to 46.2% by weight of a modifying agent selected from the group consisting essentially of dimethyl formamide, dimethyl acetamide, dimethyl propionamide, N-ethylacetamide, ethylene glycol, dimethyl sulfoxide, diethylcyanamide, and tributylamine;
   (b) said electrolyte having a conducting salt dissolved therein from about 0.06% to 4.0% by weight, said salt including a cation and a film-forming anion.

References Cited

UNITED STATES PATENTS

| 2,965,690 | 12/1960 | Petersen et al. | 317—230 |
| 3,136,780 | 6/1964 | Kolyer et al. | |
| 3,138,746 | 6/1964 | Burger et al. | 317—230 |
| 3,302,071 | 1/1967 | Stahr | 317—230 |

JAMES D. KALLAM, *Primary Examiner.*